United States Patent [19]

McIntire et al.

[11] Patent Number: 5,322,580
[45] Date of Patent: Jun. 21, 1994

[54] BONDING OF THERMOSET COMPOSITE STRUCTURES TO METAL STRUCTURES

[75] Inventors: Allen J. McIntire, Ansonia; Geoffrey C. Davis, Madison, both of Conn.

[73] Assignee: United Technologies Corporation, Hartford, Conn.

[21] Appl. No.: 873,721

[22] Filed: Apr. 24, 1992

[51] Int. Cl.$^5$ .......................................... B32B 31/00
[52] U.S. Cl. .................................... 156/148; 156/153; 156/219; 156/273.9; 156/294; 156/296; 156/304.3; 156/304.5; 156/304.6; 156/307.3; 156/307.7; 156/306.9; 464/181; 464/183
[58] Field of Search ............... 156/219, 148, 242, 245, 156/273.9, 158, 153, 294, 296, 303.1, 304.3, 304.1, 304.6, 306.9, 307.3, 307.7, 304.5, 276; 228/903; 403/268, 270; 464/903, 181, 183

[56] References Cited

U.S. PATENT DOCUMENTS

| | | | |
|---|---|---|---|
| 2,372,929 | 4/1945 | Blessing | 154/43 |
| 2,715,598 | 8/1955 | Rees et al. | 154/126 |
| 2,952,578 | 9/1960 | Carlson, Jr. | 154/126 |
| 3,239,403 | 3/1966 | Williams et al. | 156/273.9 |
| 3,864,186 | 2/1975 | Balla et al. | 156/272 |
| 3,868,291 | 2/1975 | Benz et al. | 156/515 |
| 3,900,360 | 8/1975 | Leatherman | 156/276 X |
| 3,985,604 | 10/1976 | Balla | 156/244 |
| 3,993,529 | 11/1976 | Farkas | 156/380 |
| 3,996,402 | 12/1976 | Sindt | 428/140 |
| 4,045,272 | 8/1977 | Lombardi | 156/380 |
| 4,110,506 | 8/1978 | Cottingham et al. | 428/138 |
| 4,238,539 | 12/1980 | Yates et al. | 464/183 |
| 4,268,338 | 5/1981 | Peterson | 156/251 |
| 4,313,777 | 2/1982 | Buckley et al. | 156/272 |
| 4,416,713 | 11/1983 | Brooks | 156/64 |
| 4,533,589 | 8/1985 | Sewell | 156/307.3 X |
| 4,556,439 | 12/1985 | Bannick et al. | 156/344 X |
| 4,560,428 | 12/1985 | Sherrick et al. | 156/273.9 X |
| 4,704,509 | 11/1987 | Hilmersson et al. | 219/10.53 |
| 4,908,088 | 3/1990 | Boyd et al. | 156/307.3 |
| 4,957,805 | 9/1990 | Biggs et al. | 156/308.2 X |
| 4,963,215 | 10/1990 | Ayers | 156/308.2 X |

FOREIGN PATENT DOCUMENTS

| | | |
|---|---|---|
| 179451 | 10/1985 | European Pat. Off. . |
| 2620648 | 9/1987 | France . |
| 1034738 | 7/1966 | United Kingdom . |

OTHER PUBLICATIONS

NASA Tech Brief, Jules Kish, Metal-To-Composite Shaft Spline Mar. 1992.

Primary Examiner—David A. Simmons
Assistant Examiner—Chester T. Barry
Attorney, Agent, or Firm—Terrance J. Radke

[57] ABSTRACT

A method to bond metallic structures to thermoset composite structures is described. Various construction details have been developed which provide a method for producing a bond of sufficient strength to transmit torsional and axial loads between the metallic and thermoset composite structures. In one embodiment, the method includes steps to form a bonding surface on a metallic structure by knurling a mating surface of the metallic structure and molding a thermoplastic material over the knurled surface. Further, the method includes steps to form a bonding surface on a thermoset composite structure by partially embedding a layer of dry fiber into a thermoplastic cone, coating the exposed dry fiber with thermoset resin, and curing the coated dry fibers into the thermoset composite structure. The final step is to fuse the two bonding surfaces by applying heat sufficient to melt the thermoplastic material.

3 Claims, 2 Drawing Sheets

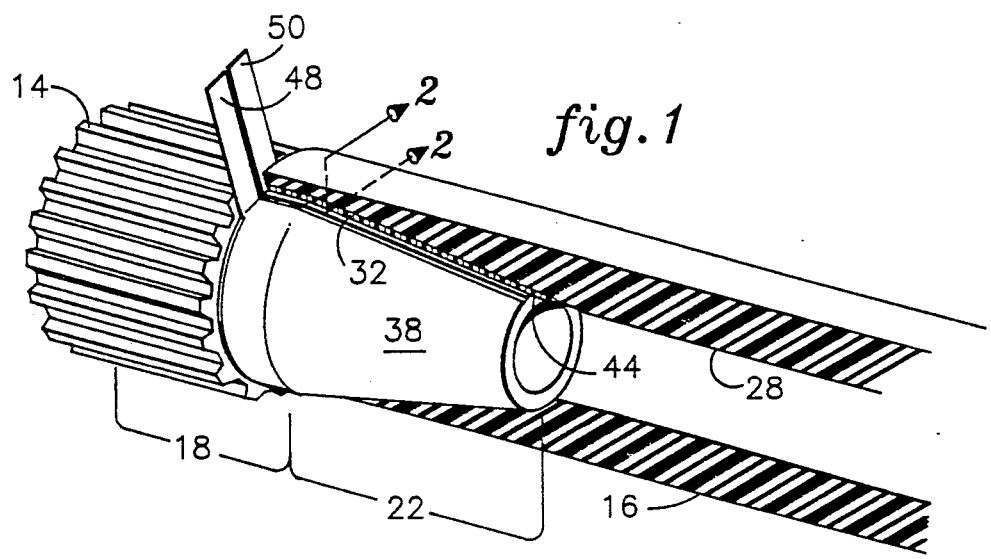
fig.1
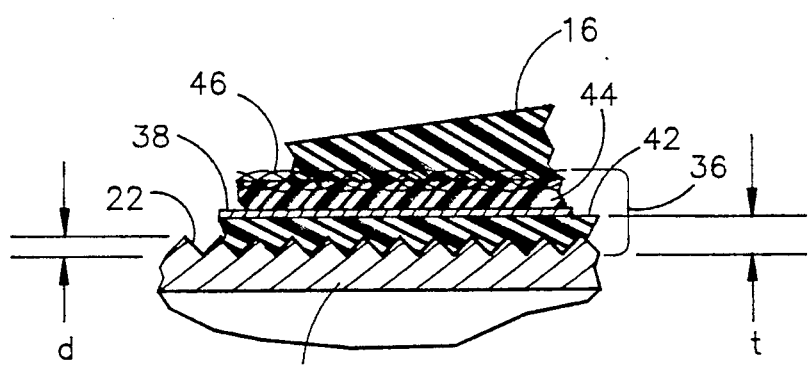
fig.2
fig.3
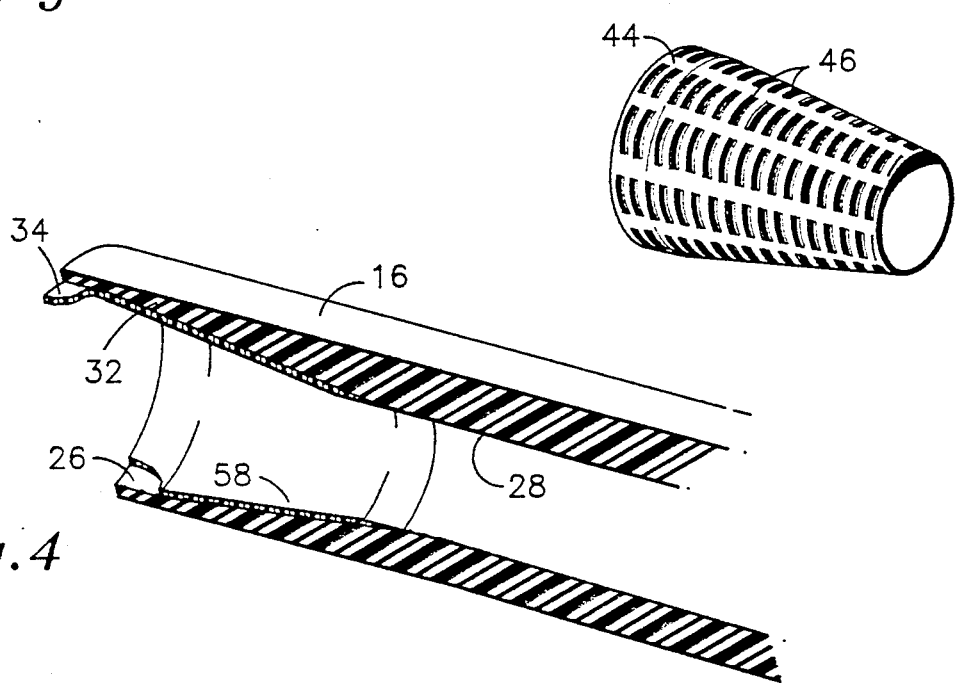
fig.4

BONDING OF THERMOSET COMPOSITE STRUCTURES TO METAL STRUCTURES

DESCRIPTION

1. Technical Field

This invention relates to a method for bonding thermoset composite structures to metal structures, and more particularly to a composite to metal bond which will transmit axial and torsional loads between the metal structure and the thermoset composite structure.

2. Background of the Invention

Thermoset composite materials have received widespread use as structural elements. These types of materials, after curing, produce a lightweight structure having relatively high strength characteristics. In the aircraft industry, the use of composite materials can produce significant weight savings.

While the uses for structural elements made from thermoset composite materials are expanding, some applications still require metallic structural members. One such application is the splined connection of a shaft to an engine. Due to the difficulties in forming a thermoset composite splined connector of sufficient strength to withstand the engine loads, metallic splined connectors are still preferred. In such a situation, however, the shaft itself may be made from a thermoset composite material and metallic fittings could be attached to the ends of the shaft. The metallic fittings would attach the shaft to the engine and also attach the shaft to the part being driven, typically a propeller.

A problem in the mating of thermoset composite shaft with metallic fittings is the attachment between the fitting and the shaft. This connection is required to transfer operational loads, both torsional and axial, between the two items. Thermoset composite materials do not fuse well with metallic materials and, once cured, cannot be reheated to reverse the bond. Standard adhesives may not be used because such adhesives do not provide a bond of sufficient strength to withstand the torsional and axial loads transmitted from the fitting to the shaft.

One solution in the prior art is to mechanically connect the fitting to the shaft. A connection of this type may use such things as pins and/or flanges adapted to be bolted together. The pinned connections and/or flange portions add to the complexity and the difficulty of fabricating the composite filament. In addition, the mechanical connectors increase the weight of the shaft and fitting relative to a simple bonded shaft and fitting.

The above art notwithstanding, scientists and engineers under the direction of Applicants' Assignee are working to develop methods to bond metallic and composite materials in a manner which will permit the transmission of axial and torsional loads through the bond.

DISCLOSURE OF THE INVENTION

According to the present invention, a method of bonding a metallic structure to a thermoset composite structure includes the steps of knurling a mating surface of a metallic structure, molding a thermoplastic composite material over the knurled mating surface to produce a first bonding surface, partially embedding a layer of dry fiber reinforcement into a layer of thermoplastic material, coating the exposed dry fiber with a thermoset resin, co-curing the layer of thermoplastic material with a thermoset composite structure to produce a second bonding surface, and consolidating the two bonding surfaces.

According further to the present invention, the bonding method includes the steps of placing a resistance heating element over the first bonding surface, engaging the first bonding surface with the second bonding surface with the resistance heating element sandwiched therebetween, and passing an electrical current through the resistance heating element to fuse the thermoplastic composite material of the two bonding surfaces together.

A principal feature of the present invention is the knurled mating surface of the metallic structure. Another feature is the layer of thermoplastic composite material molded over the knurled surface to form a bonding surface. Another feature is the dry fiber reinforcement fused into both the thermoset composite structure and the thermoplastic material. A feature of one specific embodiment is the resistance heating element sandwiched between the two bonding surfaces.

A primary advantage of the present invention is the mechanical lock between the metallic structure and the composite structure as a result of the knurled surface which is embedded into the composite structure. The knurled surface provides a mechanism to transfer both torsional and axial loads from the metallic structure to the composite structure. Another advantage is the mechanical lock between the thermoplastic material and the thermoset composite structure as a result of the dry fiber reinforcement. The dry fiber reinforcement increases the bond strength between the thermoplastic material and the composite structure. An advantage of one embodiment is the reversibility of the bonding of the metallic structure to the thermoset composite structure as a result of the embedded resistance heating element in the bond and the thermoplastic material used in the bond surfaces. The thermoplastic material may be reheated repeatedly by passing electrical current through the resistance heating element to melt the thermoplastic material.

The foregoing and other objects, features and advantages of the present invention will become more apparent in light of the following detailed description of the exemplary embodiments thereof, as illustrated in the accompanying drawings.

BRIEF DESCRIPTION OF THE DRAWINGS

FIG. 1 is a partially sectioned view of a metal structure bonded to a thermoset composite structure with a resistance heating element sandwiched within the bond surfaces.

FIG. 2 is a view taken along line 2—2 of FIG. 1, showing a bond layer.

FIG. 3 is a perspective view of a thermoplastic cone having a layer of dry fiber reinforcement partially embedded into it.

FIG. 4 is a partially sectioned view of a thermoset composite structure showing a bond surface formed of thermoplastic composite material and dry fiber reinforcement.

BEST MODE FOR CARRYING OUT THE INVENTION

Figure 5:
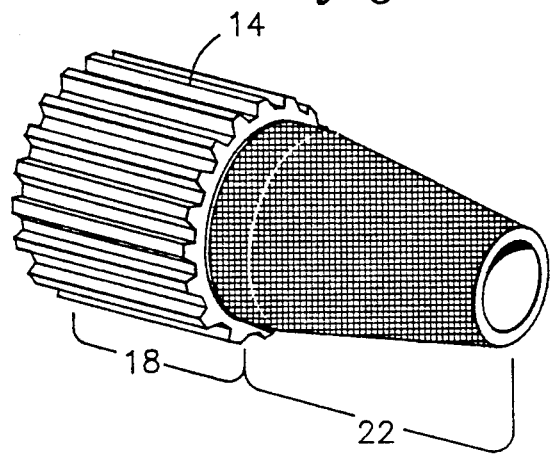
FIG. 5 is a perspective view of a metallic structure having a knurled conical mating surface.

FIG. 1 illustrates a drive assembly 12 including a metallic fitting 14 bonded to a thermoset composite shaft 16. The metallic fitting includes a splined portion 18 and a mating surface 22. The splined portion is adapted to be engaged with a force transmitting element, such as a gas turbine engine. The mating surface is frustoconically shaped and is deeply knurled in a random fashion. The thermoset composite shaft is attached to the fitting through engagement with the mating surface of the fitting. The shaft is a hollow cylindrical structure having a mating surface 26 disposed about the radially inner surface 28 of the end of the shaft. The mating surface has a relatively short cylindrical portion 32 and a relatively longer frustoconical portion 34.

The shaft is bonded to the fitting by a bond layer 36 disposed between the two mating surfaces, as shown in FIG. 2. The bond layer includes a resistance heating element 38 sandwiched between the two mating surfaces, a first layer 42 of thermoplastic material between the fitting mating surface and the heating element (see FIG. 5), a second layer 44 of thermoplastic material between the heating element and the shaft mating surface, and a layer of dry fiber reinforcement 46 embedded in both the second layer of thermoplastic material and the shaft (see FIG. 2). The resistance heating element includes two electrical leads 48, 50 which extend out from the bond layer. The electrical leads are adapted to be connected to a source of electrical energy (not shown). The electrical leads permit passage of an electrical current through the resistance heating element to heat the bond layer during the bonding process.

The bond is effectuated by engagement between the knurls of the mating surface with the layers of thermoplastic material and by engagement of the layer of dry fiber with both the thermoset composite shaft and the layer of thermoplastic material. The knurls provide a mechanical lock or bite into the layers of thermoplastic composite material. The random arrangement of the knurls produces a mechanical lock to both axial and rotational forces transmitted from the fitting to the layers of thermoplastic material. The layer of dry fiber provides a mechanical lock between the layers of thermoplastic material and the thermoset composite shaft.

A method of bonding the metallic fitting to the thermoset composite shaft is illustrated in FIGS. 3-8. The method is comprised of steps to produce a bonding surface 58 on the thermoset composite shaft (see FIGS. 3-4), steps to produce a bonding surface on the metallic fitting (see FIGS. 5-8) and steps to bond the two bonding surfaces together. The first step to produce the bonding surface 58 is to partially embed a layer of dry fiber reinforcement into a thermoplastic cone 54 which is a frustoconically shaped section of a thermoplastic composite material. The dry fiber reinforcement is embedded into the radially outer surface of the thermoplastic cone in such a way to produce an embedded portion and an exposed portion.

Partially embedding the layer of dry fiber into the thermoplastic cone may be performed by various procedures. A first method involves weaving commingled strands of thermoplastic material and dry fiber with strands of dry fiber. Commingled strands are formed by intimately consolidating dry fiber strands with spun thermoplastic filaments. Dry fiber strands are then woven together with the commingled strands to form a woven material which is predominantly dry fiber on one side and commingled strands on the other side. An alternate weaving procedure is to weave dry fiber strands with spun thermoplastic filaments to produce a woven material which is predominantly dry fiber on one side and thermoplastic filaments on the other. A further alternate method of partially embedding the dry fiber into the layer of the thermoplastic is as follows. First, intimately fuse together a layer of semi-crystalline thermoplastic material and a layer of amorphous thermoplastic material. The semi-crystalline thermoplastic material has a higher melt temperature than the amorphous thermoplastic material. The layer of amorphous thermoplastic material is thinner than the layer of dry fiber. Second, press the layer of dry fiber onto the layer of amorphous thermoplastic material and heat the fused layers of thermoplastic material with sufficient heat to melt the amorphous thermoplastic material, but not the semi-crystalline thermoplastic material. In this way the layer of semi-crystalline material provides a barrier to prevent completely embedding the layer of dry fiber. Although the three methods described above are suggested as possible methods of partially embedding dry fiber into a thermoplastic cone, it should be understood that various other methods may also be used.

The next step in the bonding surface 58 preparation is to coat the exposed portion with a thermoset composite resin which is compatible with the thermoset composite structure. The third step is to engage the exposed portion of the dry fiber reinforcement, which is now coated with thermoset resin, with the mating surface of an uncured thermoset composite structure. Subsequent to engagement, the thermoset composite structure and the thermoplastic cone are co-cured. During co-curing, the exposed portion wets out into the thermoset composite structure, due to the pressure of the resin, and a bonding surface 58 is produced. The bonding surface includes the layer of thermoplastic composite material and the layer of dry fiber reinforcement which is partially embedded in the thermoplastic composite material and partially cured into the thermoset composite structure.

Figure 6:
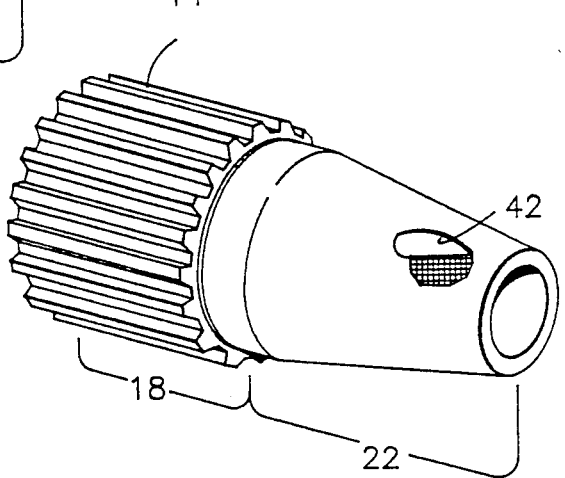
FIG. 6 is a perspective view of the metallic structure of FIG. 5 with a layer of thermoplastic composite material molded over the mating surface.
Figure 7:
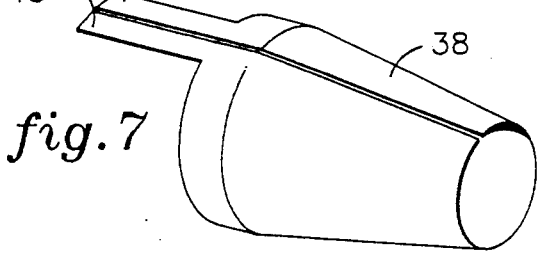
FIG. 7 is a perspective view of a resistance heating element.
Figure 8:
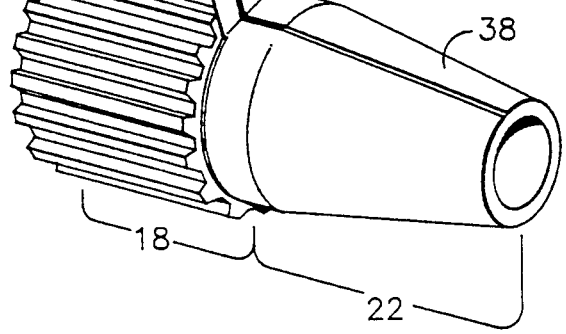
FIG. 8 is a perspective view of the metallic structure with the resistance heating element placed over the bonding surface.

The bonding surface of the metallic structure is prepared as illustrated in FIGS. 5-6. The frustoconically shaped mating surface is randomly knurled in a conventional manner, as shown in FIG. 5. The knurling 24 may be random, helical, or a combination of axial and circumferentially directed knurls. The precise pattern and depth d (see FIG. 2) of the knurls 24 depends on the forces to be transmitted between the metallic fitting 14 and the thermoplastic composite shaft 16. In general, a random pattern of knurling is acceptable for typical operational loads. Although a randomly oriented knurling is discussed, an oriented configuration of knurls may be used to optimize the load transmission in specific applications. The depth d of the knurls is dependent upon the level of force to be transmitted and the surface area of the knurled mating surface. The greater the surface area, the smaller the depth d may be.

The second step is to mold a layer of thermoplastic composite material 42 over the knurled mating surface to produce a bonding surface. The thermoplastic material selected may be unreinforced or reinforced with short fibers. Reinforced thermoplastic may be required in high load applications. During the molding step, the thermoplastic material penetrates into and around the knurls. It is suggested that the layer of thermoplastic material 26 be of sufficient thickness t (see FIG. 3) to penetrate into and completely cover the knurls 24 of the mating surface 22. This will provide a bonding surface 28 of thermoplastic composite material and ensure a mechanical lock exists between the layer of thermoplastic composite material 26 and the knurled mating surface 22.

The next step in the bonding method is to place the resistance heating element over the bonding surface of the metallic structure. The bonding surface of the metallic structure is engaged with the bonding surface of the thermoset composite structure, with the resistance heating element sandwiched therebetween, as shown in FIG. 1. An electrical current of sufficient strength to heat the resistance heating element to above the melting temperature of the thermoplastic composite material is passed through the heating element concurrent with an application of pressure to the bond area. A suggested procedure for applying pressure to structures such as those shown in FIG. 1 is to apply an axial load to the shaft and fitting. The conical shape of the bonding surfaces will provide a circumferential force component to provide adequate consolidation pressure. Other means to apply pressure may be used for structures having differently shaped bonding surfaces. The heat produced by the heating element and the applied pressure consolidates the thermoplastic material of the two bonding surfaces. It should be noted that the heat generated by the resistance heating element should be sufficient to melt the thermoplastic material but not degrade the cured thermoset composite shaft.

The resistance heating element may be left in place during use and may subsequently be used to reverse the bonding process. Reversing the bonding process will require passing an electrical current through the resistance heating element to remelt the thermoplastic material within the bond layer. Once melted, the metallic fixture can be separated from the thermoset composite shaft. Reversing the bonding process permits replacement of either the fitting or the shaft as necessary.

The resistance heating element provides means to heat the bond layer to effectuate the consolidation of the layers of thermoplastic material and to reverse the consolidation. The resistance heating element may be chosen from a variety of electrically conductive elements including pierced and stretched foils, etched foils, stamped elements, and wound wire serpentine. The resistance heating element selected should provide means to heat the bonding surfaces in a substantially uniform manner. Uniform heating will minimize the occurrence of hot spots and cold spots during the bonding process which may degrade the quality of the bond. Although an embedded resistance heating element is shown and suggested as a convenient means to heat the bonding surfaces, other means of heating may be used, such as induction heating.

Although the invention has been shown and described with respect to exemplary embodiments thereof, it should be understood by those skilled in the art that various changes, omissions and additions may be made therein and thereto, without departing from the spirit and scope of the invention.

We claim:

1. A method for bonding a metallic structure to a thermoset composite structure, the metallic structure being frustoconically shaped and having a mating surface, the method comprising the steps of:

knurling the mating surface of the metallic structure;

molding a layer of thermoplastic composite material over the knurled mating surface to produce a bonding surface;

partially embedding a layer of dry fiber reinforcement into a laminate of thermoplastic material to produce an embedded portion and an exposed portion of dry fiber reinforcement, said partial embedding step further including the substeps of intimately fusing together a layer of semi-crystalline thermoplastic material and a layer of amorphous thermoplastic material, pressing the layer of dry fiber reinforcement into the layer of amorphous thermoplastic material, the thickness of the layer of dry fiber reinforcement being substantially greater than the thickness of the amorphous thermoplastic material, and applying heat sufficient to melt the layer of amorphous thermoplastic material, but not melt the semi-crystalline thermoplastic material layer;

coating the exposed portion of dry fiber reinforcement with a thermoset composite resin;

engaging the resin coated exposed portion of dry fiber reinforcement with a mating surface of the thermoset composite structure;

curing the thermoset composite structure with the mating surface thereof and the resin coated exposed portion of dry fiber reinforcement thereof engaged wherein the semicrystalline thermoplastic material provides a bonding surface for the cured thermoset composite structure; and consolidating the bonding surface of the metallic structure with the bonding surface of the thermoset composite structure by engaging the bonding surfaces and applying heat and pressure to the engaged bonding surfaces.

2. A method for bonding a metallic structure to a thermoset composite structure, the metallic structure being frustoconically shaped and having a mating surface, the method comprising the steps of:

knurling the mating surface of the metallic structure;

molding a layer of thermoplastic composite material over the knurled mating surface to produce a bonding surface;

partially embedding a layer of dry fiber reinforcement into a laminate of thermoplastic material to produce an embedded portion and an exposed portion of dry fiber reinforcement, said partial embedding step further including the substeps of intimately combining dry fiber reinforcement strands with spun thermoplastic filaments to form commingled strands, weaving the commingled strands with dry fiber reinforcement strands to form a woven material with predominantly dry fiber reinforcement strands on one side and commingled strands on the other side, the predominantly dry fiber reinforcement strands forming the exposed portion of dry fiber reinforcement, pressing the woven material onto a layer of thermoplastic material with the side of the woven material which is predominantly commingled strands adjacent to the layer of thermoplastic material, and applying heat sufficient to melt the layer of thermoplastic material to partially embed the woven material in the layer of thermoplastic material and to fuse the commingled strands to the dry fiber reinforcement strands and the layer of thermoplastic material;

coating the exposed portion of dry fiber reinforcement with a thermoset composite resin;

engaging the resin coated exposed portion of dry fiber reinforcement with a mating surface of the thermoset composite structure;

curing the thermoset composite structure with the mating surface thereof and the resin coated exposed portion of dry fiber reinforcement thereof engaged wherein the layer of thermoplastic material fused to the commingled strands provides a bonding surface for the cured thermoset composite structure; and consolidating the bonding surface of the metallic structure with the bonding surface of the thermoset composite structure by engaging the bonding surfaces and applying heat and pressure to the engaged bonding surfaces.

3. A method for bonding a metallic structure to a thermoset composite structure, the metallic structure being frustoconically shaped and having a mating surface, the method comprising the steps of:

knurling the mating surface of the metallic structure;

molding a layer of thermoplastic composite material over the knurled mating surface to produce a bonding surface;

partially embedding a layer of dry fiber reinforcement into a laminate of thermoplastic material to produce an embedded portion and an exposed portion of dry fiber reinforcement, said partial embedding step further including the substeps of weaving strands of dry fiber reinforcement and strands of spun thermoplastic filaments to form a woven material with predominantly dry fiber reinforcement on one side and a combination of strands of dry fiber reinforcement and thermoplastic filaments on the other side, the predominantly dry fiber reinforcement strands forming the exposed portion of dry fiber reinforcement, pressing the woven material onto a layer of thermoplastic material with the side of the woven material which is the combination of dry fiber strands and thermoplastic filaments adjacent to the layer of thermoplastic material, and applying heat sufficient to melt the layer of thermoplastic material to partially embed the woven material in the layer of thermoplastic material and to fuse the thermoplastic filaments to the dry fiber reinforcement and the layer of thermoplastic material;

coating the exposed portion of dry fiber reinforcement with a thermoset composite resin;

engaging the resin coated exposed portion of dry fiber reinforcement with a mating surface of the thermoset composite structure;

curing the thermoset composite structure with the mating surface thereof and the resin coated exposed portion of dry fiber reinforcement thereof engaged wherein the layer of thermoplastic material fused to the thermoplastic filaments provides a bonding surface for the cured thermoset composite structure; and consolidating the bonding surface of the metallic structure with the bonding surface of the thermoset composite structure by engaging the bonding surfaces and applying heat and pressure to the engaged bonding surfaces.

* * * * *